3,530,197
CODIMERIZATION OF α-OLEFINS AND CONJUGATED DIOLEFINS
James D. McClure, Oakland, Calif., assignor to Shell Oil Company, New York, N.Y., a corporation of Delaware
No Drawing. Filed Aug. 28, 1968, Ser. No. 755,787
Int. Cl. C07c *3/10, 11/12*
U.S. Cl. 260—680                5 Claims

ABSTRACT OF THE DISCLOSURE

Alpha-olefins and conjugated diolefins are codimerized in the presence of catalytic amounts of π-(cyclopentenyl)cyclopentadienylnickel and an organoaluminum compound.

BACKGROUND OF THE INVENTION

It is known that certain transition metal catalyst compositions are useful in the codimerization of lower α-olefins and conjugated diolefins into olefinic products of higher molecular weight. Miller et al., J. Am. Chem. Soc. 89, 3756, describes a process wherein a homogenous catalyst composition prepared from an organonickel compound and an organoaluminum compound is employed to codimerize α-olefins and conjugated dienes. In the process of Miller et al., the type of nickel compound is not critical provided that an organophosphine or organophosphite ligand is present. It would be of advantage, however, to provide nickel-containing catalyst compositions which do not require organophosphine or organphosphite groups for catalytic activity.

SUMMARY OF THE INVENTION

It has now been found that the codimerization of α-olefins and conjugated diolefins is advantageously effected with a catalyst composition produced by reacting π-(cyclopentenyl)cyclopentadienylnickel with an organoaluminum compound.

DESCRIPTION OF THE PREFERRED EMBODIMENTS

The olefinic reactants

The alpha-olefin employed in the process of the invention is a straight-chain hydrocarbon monoolefin of from 2 to 4 carbon atoms, i.e., ethylene, propylene and 1-butene. The preferred α-olefin reactant is ethylene.

The process of the invention is broadly applicable to any conjugated diolefin wherein at least three carbon atoms of the two olefinic linkages have at least one hydrogen substituent. One class of suitable conjugated diolefins is conjugated hydrocarbon aliphatic diolefins of from 2 to 6 carbon atoms such as butadiene, isoprene, 1,3-pentadiene, 2,3-dimethyl-1,3-butadiene, and 2-methyl-1,3-pentadiene. Preferred conjugated diolefins have at least one terminal methylene group, i.e., a carbon atom of at least one olefinic linkage has two hydrogen substituents. Particularly preferred are straight-chain conjugated diolefins having at least one terminal methylene group, e.g., butadiene and 1,3-pentadiene.

The molar ratio of α-olefin to conjugated diolefin employed in the codimerization process is not critical. In general, molar ratios of α-olefin to conjugated diolefin of from about 10:1 to about 1:10 are satisfactory with molar ratios from about 1:3 to about 3:1 being preferred.

The catalyst components

The precise chemical form of the nickel-containing catalyst composition is not known with certainty and the catalyst composition is best defined in terms of its method of production. The catalyst composition results from the intimate contact of π-(cyclopentenyl)cyclopentadienylnickel and an organoaluminum compound. The π-(cyclopentenyl)cyclopentadienylnickel is a known compound, being disclosed, for example, by Wollensack, U.S. 3,088,960 issued May 7, 1963.

In general, organoaluminum compounds, such as alkyl aluminum alkoxides, alkyl aluminum sesquihalides and trialkylaluminum compounds are suitable as catalyst components. Superior results, however, are obtained with dialkyl aluminum halides wherein the alkyl groups are lower alkyl of from one to four carbon atoms, e.g., methyl, ethyl, propyl, isopropyl, butyl and isobutyl, and the halogens are of atomic number from 17 to 35 inclusive, i.e., the middle halogens chlorine and bromine. Illustrative of suitable dialkyl aluminum halides are dimethylaluminum chloride, diethylaluminum chloride, diisopropylaluminum bromide, dipropylaluminum chloride, and diisobutylaluminum chloride. The preferred dialkyl aluminum halide is diethylaluminum chloride.

The catalyst components are generally contacted in molar ratios of organoaluminum compound to π-(cyclopentenyl)cyclopentadienylnickel of from about 0.5:1 to about 5:1 although molar ratios of from about 0.8:1 to about 1.2:1 are preferred. The catalyst composition is suitably preformed by contacting the catalyst precursor components in an inert diluent, e.g., diluents employed for the contacting of olefinic reactants with the catalyst composition. In the preferred modification, however, the catalyst precursor components are contacted in the presence of one or both of the olefinic reactants during the initiation of the codimerization process.

The amount of catalyst composition employed in the codimerization process is not critical. In general, amounts of catalyst composition from about 0.001% by weight to about 10% by weight based on conjugated diolefin are satisfactory with amounts from about 0.01% by weight to about 3% by weight on the same basis being preferred.

The reaction conditions

The olefinic reactants are customarily contacted with the catalyst composition or the catalyst precursor components in the liquid phase in an inert diluent which is liquid at the reaction temperature and pressure. Suitable diluents are hydrocarbons and halohydrocarbons such as perchloroethylene, hexane, methylene chloride, octane, dodecane, cyclohexane, decahydronaphthalene, benzene, toluene and chlorobenzene. In certain modifications, for example, as when either the α-olefin or conjugated diolefin is employed in excess, a portion of the α-olefin or conjugated diolefin suitably serves as reaction diluent and no added reaction diluent is required. When reaction diluent is utilized, however, amounts up to about 10 moles of diluent per mole of conjugated diolefin are satisfactory. The process is preferably conducted in an inert reaction environment so that the presence of reactive materials such as water and oxygen is desirably avoided. Suitable reaction conditions are therefore substantially anhydrous and substantially oxygen-free.

A variety of procedures can be employed for contacting the α-olefin and conjugated diolefin reactants with the catalyst or the catalyst precursor components. In one modification, the entire amounts of the α-olefin, the conjugated diolefin, the catalyst precursor components and diluent are charged to an autoclave or similar pressure reactor and maintained at reaction conditions for the desired reaction period. In another modification, the process is conducted in a continuous manner by contacting the olefinic reactants and catalyst components during passage through a reactor which is typically tubular in form. In yet another modification, one olefinic reactant is added to the other olefinic reactant and catalyst components in increments, as by adding the α-olefin to a solution of the conjugated diolefin and catalyst composition. By any modification, the process is most efficiently conducted at elevated temperature and pressure. In general, temperatures varying from about 50° C. to about 150° C. are satisfactory with temperatures from about 80° C. to about 120° C. being preferred. Suitable reaction pressures are those which serve to maintain the reaction mixture substantially in the liquid phase. Reaction pressures from about 1 atmosphere to about 50 atmospheres in general are satisfactory although pressure of from about 10 atmospheres to about 35 atmospheres are preferred.

At the conclusion of reaction, the product mixture is separated and the dimeric products are recovered by conventional methods such as fractional distillation, selective extraction, selective adsorption and the like. The reaction diluent, the catalyst composition and any unreacted olefins are recycled for further utilization.

The products

According to the process of the invention the α-olefin and conjugated diolefins are codimerized to give a diolefin product mixture which contains a high proportion of 1,4-dienes. By way of illustration, the codimerization of ethylene and butadiene affords principally 1,4-hexadiene and smaller amounts of 2,4-hexadiene. Other 1,4-diene products include 2-methyl-1,4-hexadiene from propylene and 1,3-butadiene; 3-methyl-1,4-hexadiene from ethylene and 1,3-pentadiene; 4-methyl-1,4-hexadiene from ethylene and isoprene; 2-ethyl-1,4-hexadiene from 1-butene and butadiene.

The diolefin products have established utility as precursors of polymers, including copolymers. For example, 1,4-hexadiene is of commercial importance as the third monomer for sulfur-curable ethylene-propylene-diolefin copolymer rubber.

To further illustrate the improved process of the invention and the novel catalyst composition therefor, the following examples are provided. It should be understood that the details thereof are not to be regarded as limitations as they may be varied as will be understood by one skilled in the art.

Example 1.—A 0.4 g. (2 mmole) sample of π-(cyclopentenyl)cyclopentadienyl-nickel, 12 g. of butadiene and 20 g. of benzene were charged to a 80 ml. autoclave. After the π-(cyclopentyl)cyclopentadienylnickel had dissolved, 1.8 mmoles of diethylaluminum chloride and 300 p.s.i.g. of ethylene were charged to the autoclave and the autoclave was heated to 100° C. As the reaction progressed, additional ethylene was charged to maintain the pressure at 500 p.s.i.g. After a reaction period of three hours at a temperature of 100° C., the reaction was terminated. Gas liquid chromatographic analysis showed a 40% conversion of butadiene and 4.1 g. (55% yield) of 1,4-hexadiene and 1.4 g. (20% yield) of 2,4-hexadiene.

Example II.—The codimerization of ethylene and butadiene was conducted by a procedure identical to Example I, except that 2.8 mmoles diisobutylaluminum chloride was employed instead of diethylaluminum chloride. Analysis of the reaction mixture showed a 23% conversion of butadiene to a product mixture which contained 2.5 g. of 1,4-hexadiene and 1.2 g. of 2,4-hexadiene.

I claim as my invention:

1. A process of codimerizing in the liquid phase hydrocarbon α-olefin of from 2 to 4 carbon atoms and conjugated hydrocarbon diolefin of from 4 to 6 carbon atoms with a catalyst composition produced by contacting π-(cyclopentenyl)cyclopentadienylnickel and a lower dialkyl aluminum halide of halogen of atomic number from 17 to 35 inclusive, the molar ratio of dialkyl aluminum halide to π-(cyclopentenyl)cyclopentadienylnickel being from about 0.5:1 to about 5:1, at a temperature of from about 50° C. to about 150° C. and at a pressure of from about 1 atmosphere to about 50 atmospheres.

2. The process of claim 1 wherein the α-olefin is ethylene.

3. The process of claim 2 wherein at least one carbon atom of the conjugated diolefin is terminal methylene.

4. The process of claim 3 wherein the diolefin is butadiene.

5. The process of claim 3 wherein the dialkyl aluminum halide is diethylaluminum chloride.

References Cited

UNITED STATES PATENTS

| | | | |
|---|---|---|---|
| 3,306,948 | 2/1967 | Kealy | 260—680 |
| 3,379,706 | 4/1968 | Wilke | 260—683.15 X |
| 3,424,816 | 1/1969 | McClure et al. | 260—683.15 |
| 3,428,699 | 2/1969 | Schleimer | 260—680 X |

PAUL M. COUGHLAN, Jr., Primary Examiner

U.S. Cl. X.R.

252—431